United States Patent [19]
Nishi et al.

[11] Patent Number: 5,521,350
[45] Date of Patent: May 28, 1996

[54] STAND-OFF CONTROL APPARATUS FOR PLASMA PROCESSING MACHINES

[75] Inventors: Yozo Nishi, Hiratsuka; Iwao Kurokawa, Yokohama, both of Japan

[73] Assignee: Kabushiki Kaisha Komatsu Seisakusho, Tokyo, Japan

[21] Appl. No.: 318,608

[22] Filed: Oct. 6, 1994

[30] Foreign Application Priority Data

Apr. 6, 1992 [JP] Japan .................... 4-029095 U

[51] Int. Cl.$^6$ ..................... B23K 10/00; B23K 9/095
[52] U.S. Cl. ................. 219/121.56; 219/121.54; 219/124.02; 219/130.01
[58] Field of Search ............... 219/121.54, 121.56, 219/121.57, 121.4, 124.02, 124.03, 124.1, 130.01, 130.31

[56] References Cited

U.S. PATENT DOCUMENTS

| | | | |
|---|---|---|---|
| 3,949,188 | 4/1976 | Tateno | 219/121 P |
| 4,550,241 | 10/1985 | Scott et al. | 219/121 LG |
| 5,288,970 | 2/1994 | Nishi | 219/121.56 |
| 5,326,955 | 7/1994 | Nishi et al. | 219/121.56 |

FOREIGN PATENT DOCUMENTS

| | | |
|---|---|---|
| 2706232A1 | 8/1978 | Germany . |
| 3-297576 | 12/1991 | Japan . |
| 5-378 | 1/1993 | Japan . |

*Primary Examiner*—Mark H. Paschall
*Attorney, Agent, or Firm*—Richards, Medlock & Andrews

[57] ABSTRACT

A stand-off control apparatus for plasma processing machines which is capable of maintaining an optimum stand-off even when a processing speed varies. In a stand-off control apparatus for plasma processing machines which is provided with a microcomputer (4) for maintaining an optimum stand-off ($h_0$) by moving a torch toward/away from a work so that an independently inputted arc voltage (V) agrees with a speed-corrected target arc voltage ($V_{O(F)}$) obtained by correcting a target arc voltage ($V_O$), which is stored in advance, for an independently inputted processing speed (F), the microcomputer (4) determines at the time of varying a processing speed (F) whether the speed is being accelerated, being decelerated or being kept unchanged, and provides that the speed-corrected target arc voltage ($V_{O(F)}$) for the respective case is applied after the lapse of a corresponding delay time ($\Delta t$) which is independently stored.

13 Claims, 5 Drawing Sheets

STAND-OFF CONTROL APPARATUS FOR PLASMA PROCESSING MACHINES

TECHNICAL FIELD

The present invention relates to improvement in a stand-off control apparatus for plasma processing machines, and particularly to a stand-off control apparatus for plasma processing machines which is capable of maintaining an optimum stand-off even when a cutting speed varies.

BACKGROUND ART

A stand-off is the distance between a torch and a work to be processed in plasma processing. Maintaining the stand-off at an optimum value is selected as an objective in order to improve processing quality. A conventional stand-off control apparatus for plasma processing machines will be briefly described below.

A technique has been known (refer to, for example DE2706232) which tries to maintain an optimum stand-off $h_0$ by monitoring an arc voltage V from the fact that "a stand-off h is in proportion to the arc voltage V at a fixed cutting speed F." However, the fixed stand-off system cannot cope with a case where the cutting speed F needs to be varied for improved processing accuracy and productivity. In other words, the fixed stand-off system can manipulate two-dimensional processing machines like XY tables with less difficulty, but basically cannot manipulate three-dimensional processing machines, which cover a wider range of cutting speeds.

In this connection, the applicants for the present invention have previously proposed a technique (refer to Japanese Patent Application No. 3-110790, published as Japanese Published Unexamined Patent Application (A) 5-378) of maintaining the optimum stand-off $h_0$ by monitoring the arc voltage and the processing speed F, wherein the fact that "the arc voltage V is substantially in inverse proportion to the cutting speed F", as shown in FIG. 5, is incorporated into the aforesaid technique. The proposed technique is hereinafter referred to as speed-corrected stand-off system.

The correction of a target voltage $V_O$ for a speed in the speed-corrected stand-off system will now be described with reference to FIG. 5. In the figure, measurements of the cutting speed F and the arc voltage V are plotted for stand-off's $h_1$–$h_5$ ($h_1$<$h_5$). For the stand-off's $h_1$–$h_5$, as the cutting speed F increases, the arc voltage V drops substantially in an inversely proportional manner. This is because as the cutting speed F increases, the main anode point of the work comes closer to the torch. For example, with a reference cutting speed taken as $F_L$ and a target arc voltage as $V_L$ at the initially set optimum stand-off $h_1$, when the cutting speed increases to $F_H$, the arc voltage drops from $V_L$ to $V_H$. However, because of the target arc voltage $V_L$ being fixed, the result of their comparison, i.e. $V_H$<$V_L$, causes the torch to rise from $h_1$ to $h_3$ with a resultant failure to maintain the optimum stand-off $h_1$. Hence, by correcting the initial target arc voltage $V_O$ for an inputted cutting speed F, i.e., by making correction to a new target arc voltage $V_H$ at the stand-off $h_1$ and the cutting speed $F_H$, the optimum stand-off $h_1$ is maintained even when the cutting speed F varies. Accordingly, while the processing speed is kept unchanged at a stationary level before and after it varies, the quality of processing is quite good.

However, even in the speed-corrected stand-off system, when the processing speed varies, i.e., when variations in the processing speed begin, are under way, and then end, it is difficult to maintain the optimum stand-off $h_0$ because variations in the arc voltage V get delayed due to delay in the response of the position of the plasma arc's main anode point to operations of a processing machine. The time of variations in the processing speed is usually short, but even so, there arises a problem that the quality of processing deteriorates during the time.

SUMMARY OF THE INVENTION

In view of the foregoing problem, it is an object of the present invention to provide a stand-off control apparatus for plasma processing machines which is capable of maintaining an optimum stand-off even when a processing speed varies.

According to the present invention, in a stand-off control apparatus for plasma processing machines which is provided with a microcomputer for maintaining an optimum stand-off $h_0$ by moving a torch toward/away from a work to be processed so that an independently inputted arc voltage V agrees with a speed-corrected target arc voltage $V_{O(F)}$ obtained by correcting a target arc voltage $V_O$, which is stored either automatically or manually in advance, for an independently inputted cutting speed F, the microcomputer determines at the time of varying a cutting speed F whether the cutting speed F is being accelerated, being decelerated or being kept unchanged, and provides that the speed-corrected target arc voltage $V_{O(F)}$ for the respective case of accelerating the speed, decelerating the speed and keeping the speed unchanged is applied after the lapse of a corresponding delay time $\Delta t$ which is independently stored for each of the cases.

Even when the cutting speed varies, the optimum stand-off $h_0$ can be kept unchanged by stabilizing the arc voltage V. The arc voltage V can be stabilized by preventing it from responding to a delay in operations of the processing machine and a delay in the response of a plasma arc. Hence, the microcomputer is designed to determine whether the cutting speed is being accelerated, being decelerated or being kept unchanged when the cutting speed varies. The delay time $\Delta t$ corresponding to the degree of a speed variation is stored in advance. Each delay time $\Delta t$ is set so as to cover the delay in operations of the processing machine and the delay in the response of the plasma arc. Accordingly, when the microcomputer determines at the time of varying the cutting speed F whether the cutting speed F is being accelerated, being decelerated or being kept unchanged, it retrieves the delay time $\Delta t$ corresponding to the degree of the speed variation. After the lapse of the delay time $\Delta t$, the speed-corrected target arc voltage $V_{O(F)}$ is applied. As a result, the arc voltage V is not influenced by the delay in operations of the processing machine and the delay in the response of the plasma arc, thereby maintaining the optimum stand-off $h_0$.

BEST MODE FOR CARRYING OUT THE INVENTION

A preferred embodiment of the present invention will now be described with reference to FIGS. 1–4. The present embodiment is an example of applying the present invention to a three-dimensionally driven plasma processing machine of FIG. 2 and is associated with the flowchart of operations of a plasma processing machine of FIG. 3. Hence, the description of the present embodiment given below will also cover the plasma processing machine and the flowchart.

Figure 2:
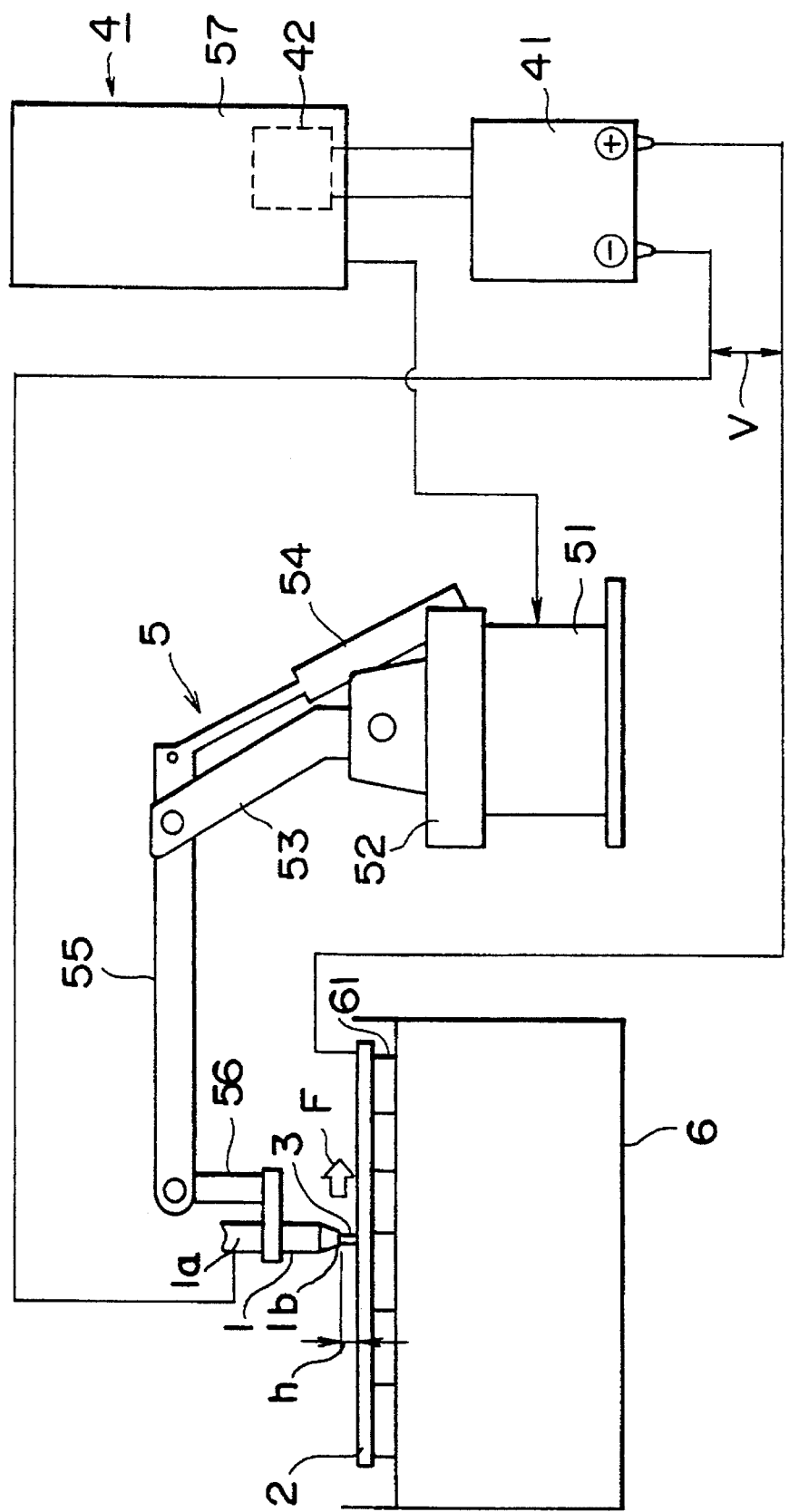
FIG. 2 is a conceptual sketch of a plasma processing machine equipped with the control apparatus according to the invention.

As shown in FIG. 2, a robot 5, which is the main body of the plasma processing machine, substantially comprises a swing device 52 on a base 51, a boom 53 mounted on the swing device 52, an arm 55 which is pin connected with the boom 53 at its end and rises/lowers by means of a hydraulic actuator 54, a hand 56 which is pin connected with the arm 55 at its end, and a microcomputer 4 which controls the robot 5. A torch 1 is attached to the hand 56. An exhaust gas chute 6 is disposed underneath the torch 1. A needle-point platform 61 is located at the upper portion of the exhaust gas chute 6, and a work 2 to be processed is placed on the needle-point platform 61 in such a manner as to be opposed to the torch 1. Plasma cutting is performed in the following manner. An arc voltage V is applied by a power source 41 between a torch electrode 1a (negative pole) and the work 2 (positive pole) to be processed. An operation gas, fed separately to a nozzle 1b located at the end of the torch 1, is converted to a plasma arc 3. The plasma arc 3, together with an operation gas which is fed separately in such a manner as to enclose the plasma arc 3, is jetted to the work 2 to be processed on a cutting line, thereby melting the work 2 to be processed along the line and blowing out molten splashes.

Figure 1:
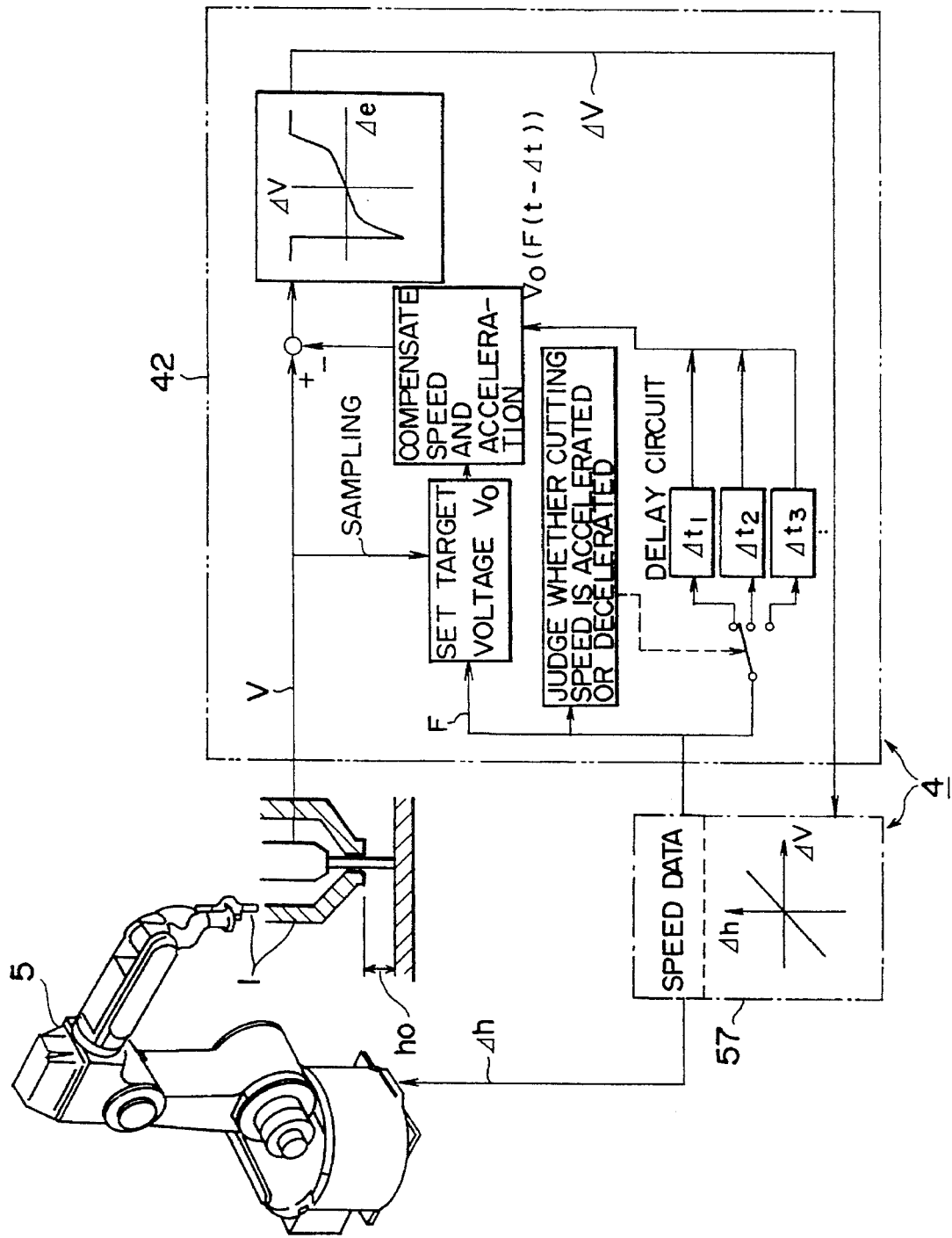
FIG. 1 is a block diagram of a stand-off control apparatus for plasma processing machines according to an embodiment of the present invention.

The microcomputer 4 to control the robot 5 comprises a robot controller 57 and a stand-off controller 42. FIG. 1 shows a block diagram of the microcomputer 4. Signals representative of a stable cutting speed F and an arc voltage V at an optimum stand-off $h_0$ immediately before starting the cutting operation are inputted to the stand-off controller 42 from the robot controller 57, thereby automatically setting a reference cutting speed $F_O$ and a target arc voltage $V_O$ at the reference cutting speed $F_O$ and the optimum stand-off $h_0$. The reference cutting speed $F_O$ and the target arc voltage $V_o$ can be set manually.

After processing has started, the stand-off controller 42 corrects the target arc voltage signal $V_O$ for the cutting speed signal F which is periodically inputted thereto from the robot controller 57, thereby making a speed-corrected target arc voltage signal $V_{O(F)}$. According to the present embodiment, the cutting speed signal F and the arc voltage signal V are inputted to the stand-off controller 42 from the robot controller 57. However, a speed sensor and a voltmeter may be provided separately for inputting therefrom the cutting speed signal F and the arc voltage signal V to the stand-off controller 42.

The stand-off controller 42 calculates variation in speed from the inputted cutting speed signal F to determine whether the cutting speed F is being accelerated, being decelerated or being kept unchanged. According to the degree of a speed variation with respect to the accelerated, decelerated or unchanged speed, the stand-off controller 42 retrieves an adequate delay time $\Delta t$ ($\Delta t_1$, $\Delta t_2$, $\Delta t_3$, . . . ), which is stored in advance for each case of accelerating the speed, decelerating the speed and keeping the speed unchanged. After the lapse of the retrieved delay time $\Delta t$, the stand-off controller 42 provides that the speed-corrected target arc voltage signal $V_{O(F)}$ is applied.

The steps of cutting the work 2 to be processed under the control of the plasma processing machine will hereinafter be described with reference to FIG. 3. Of steps S1–S16 of FIG. 3, steps S6–S9 are additional steps provided by the present embodiment.

First, the robot controller 57 starts operating under an independently inputted cut instruction (S1), and positions the torch 1 to the optimum stand-off $h_0$ with respect to the work 2 to be processed (S2).

Next, the stand-off controller 42 achieves the stable cutting speed F and the arc voltage V, inputted from the robot controller 57, immediately before starting the cutting operation by setting automatically the reference cutting speed $F_O$ and the target arc voltage $V_O$ at the reference cutting speed $F_O$ and the optimum stand-off $h_0$, and instructing the robot controller 57 to start cutting (S3). The detailed description of the setting of the reference cutting speed $F_O$ and the target arc voltage $V_O$ is omitted because it is not directly related to the present invention. A piercing operation or the like can be conducted before starting the cutting operation in some case, but the description thereof is also omitted because it is not directly related to the present invention.

Next, the stand-off controller 42 receives an actual cutting speed signal F inputted from the robot controller 57 (S4), and corrects the target arc voltage signal $V_O$ based on the actual cutting speed F to set the speed-corrected target arc voltage signal $V_{O(F)}$ (S5).

Incidentally, when cutting approaches a corner or the like, the cutting speed F is decelerated, and then after cutting has passed the corner or the like, the cutting speed F is accelerated. At such variation in the cutting speed F, the stand-off controller 42 determines whether the cutting speed F is being accelerated, being kept unchanged or being decelerated (S6). This determination is made by comparing a currently inputted cutting speed signal F and a previously inputted and stored cutting speed signal $F_1$.

If $F>F_{-1}$, the cutting speed F is being accelerated; if $F=F_{-1}$, the cutting speed F is being kept unchanged; and if $F<F_{-1}$, the cutting speed F is being decelerated.

When the cutting speed F is determined to be accelerating, a corresponding delay time $\Delta t_1$ is retrieved (S8a); when the cutting speed F is determined to be unchanged, a corresponding delay time $\Delta t_3$ is retrieved; and when the cutting speed F is determined to be decelerating, a corresponding delay time $\Delta t_2$ is retrieved (S8d). Then, a speed-corrected target arc voltage signal $V_{O\{F(t-\alpha t)\}}$ obtained by shifting time by the delay time $\Delta t_1$, $\Delta t_2$ or $\Delta t_3$ is applied. Basically, these delay times $\Delta t_1$, $\Delta t_2$ and $\Delta t_3$ are set in consideration of the delay in operations of the plasma processing machine and the delay in the response of the plasma arc, and are stored in the stand-off controller 42 in advance. In other words, with material of work, cutting speed, stand-off, arc voltage, and other factors taken into consideration, a plurality of delay times are set empirically, or the delay time is set in the manner of a linear function. With a special case of $\Delta t_1 = \Delta t_2 = \Delta t_3$ taken also into consideration, preparation of at least one delay time $\Delta t$ will do in principle.

Figure 3:
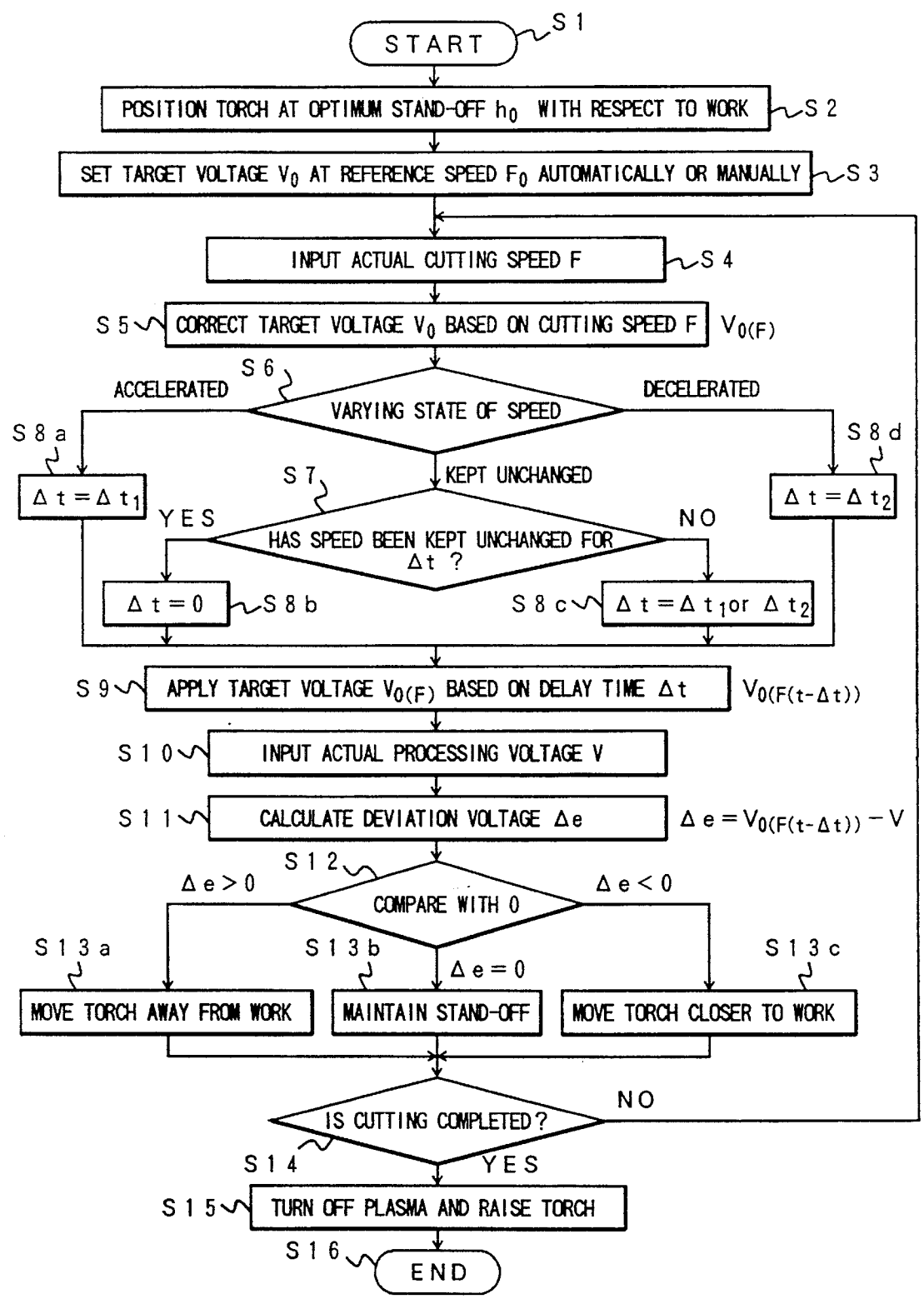
FIG. 3 is a flowchart of operations of a plasma processing machine including the control apparatus according to the invention.

The aforesaid delay time $\Delta t_3$ for the case where the cutting speed F is determined to be unchanged does not appear in FIG. 3. The figure gives an example of processing by the use of only two pieces of delay time $\Delta t_1$ and $\Delta t_2$. A case of the example is in the following construction. When the cutting speed F is determined to be unchanged (S7), the following three cases are involved: a case where the cutting speed F is kept unchanged from the beginning, a case where the cutting speed F is kept unchanged after it has been accelerated, and a case where the cutting speed F is kept unchanged after it has been decelerated. These cases are redivided into the following two cases: a case where the cutting speed F is kept unchanged from the beginning and a case where the cutting speed F is kept unchanged after it has been varied. Hence, in FIG. 3, it is a matter of course that the delay time $\Delta t$ is not set when the cutting speed F is kept unchanged from the beginning (S8b), but rather when the cutting speed F is kept unchanged after it has been varied (S8c), thus the speed-corrected target arc voltage signal $V_{O\{F(t-\Delta t)\}}$ with the delay time $\Delta t_1$ or $\Delta t_2$, set for acceleration or deceleration, is used (S9). Moreover, it is not shown, but when the cutting speed F is kept unchanged after it has been varied, a control cycle $\Delta t_0$ of the stand-off controller 42 can be replaced with the delay time $\Delta t_1$ or $\Delta t_2$.

Next, an actual arc voltage signal V is inputted (S10), and a deviation voltage signal $\Delta e = V_{O\{F(t-\Delta t)\}}$ is obtained from the difference between the speed-corrected target arc voltage signal $V_{O(F)}$ and the arc voltage signal V (S11). Then, $\Delta e$ is compared with zero (S12). If $\Delta e > 0$, the torch is moved away from the work by a stand-off $\Delta h$ corresponding to the $\Delta e$ (S13a); if $\Delta e = 0$, the stand-off $h_0$ is maintained (S13b); and if $\Delta e < 0$, the torch is moved closer to the work by a stand-off $\Delta h$ corresponding to the $\Delta e$ (S13c). $V_{O\{F(t-\Delta t)\}}$ denotes a speed-corrected target arc voltage obtained after undergoing steps S6–S9, which are additional steps provided by the present embodiment.

Steps S4–S13 are repeated based on a control cycle of the stand-off controller 42 until cutting is completed. When cutting is completed (S14), the stand-off controller 42 instructs the robot controller 57 to turn off the plasma and to move the torch away from the work (S15), and then ends operation (S16).

Figure 4:
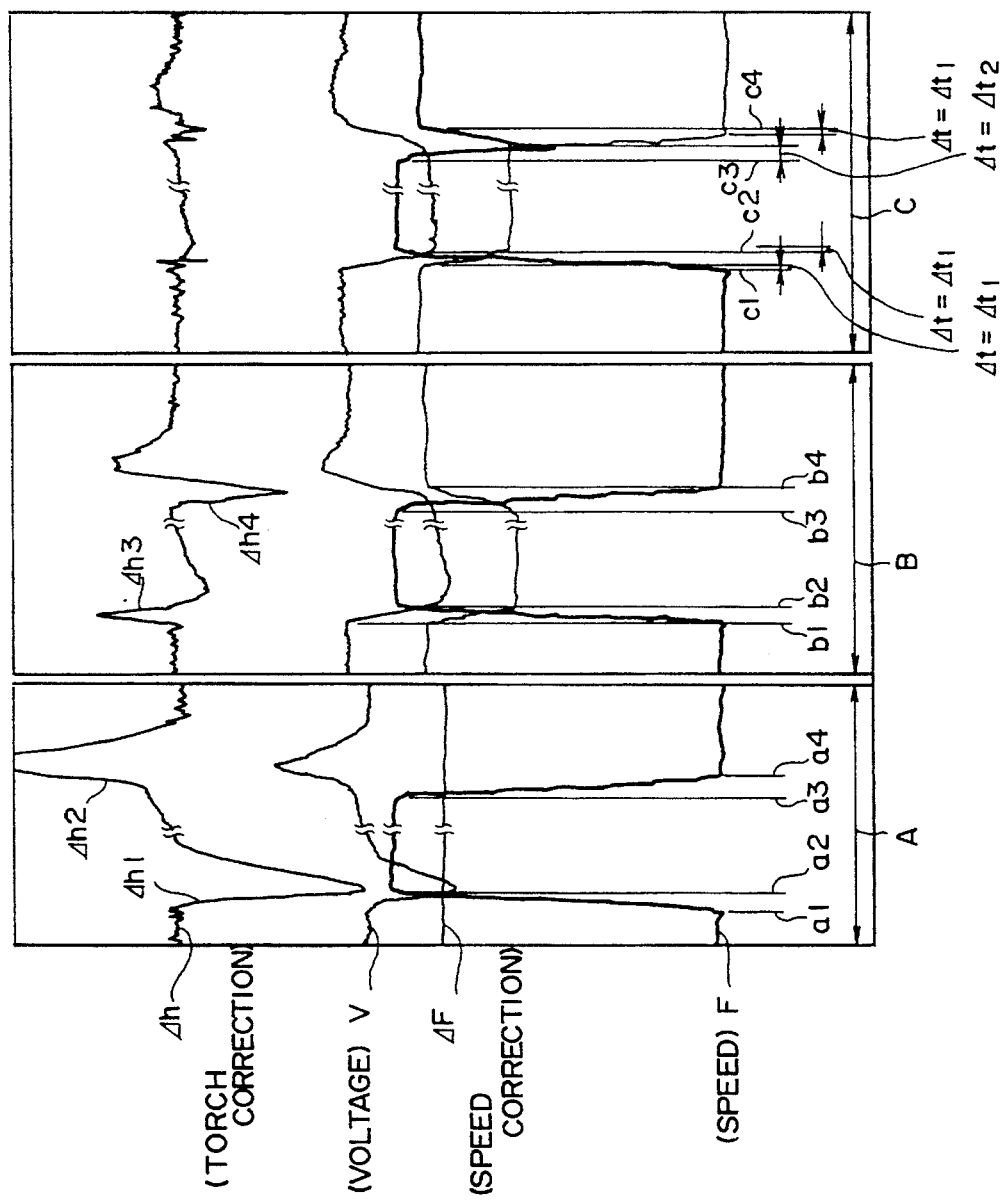
FIG. 4 is a graph of characteristics comparing the invention in which a delay time is set and prior-art examples in which a delay time is not set.
Figure 5:
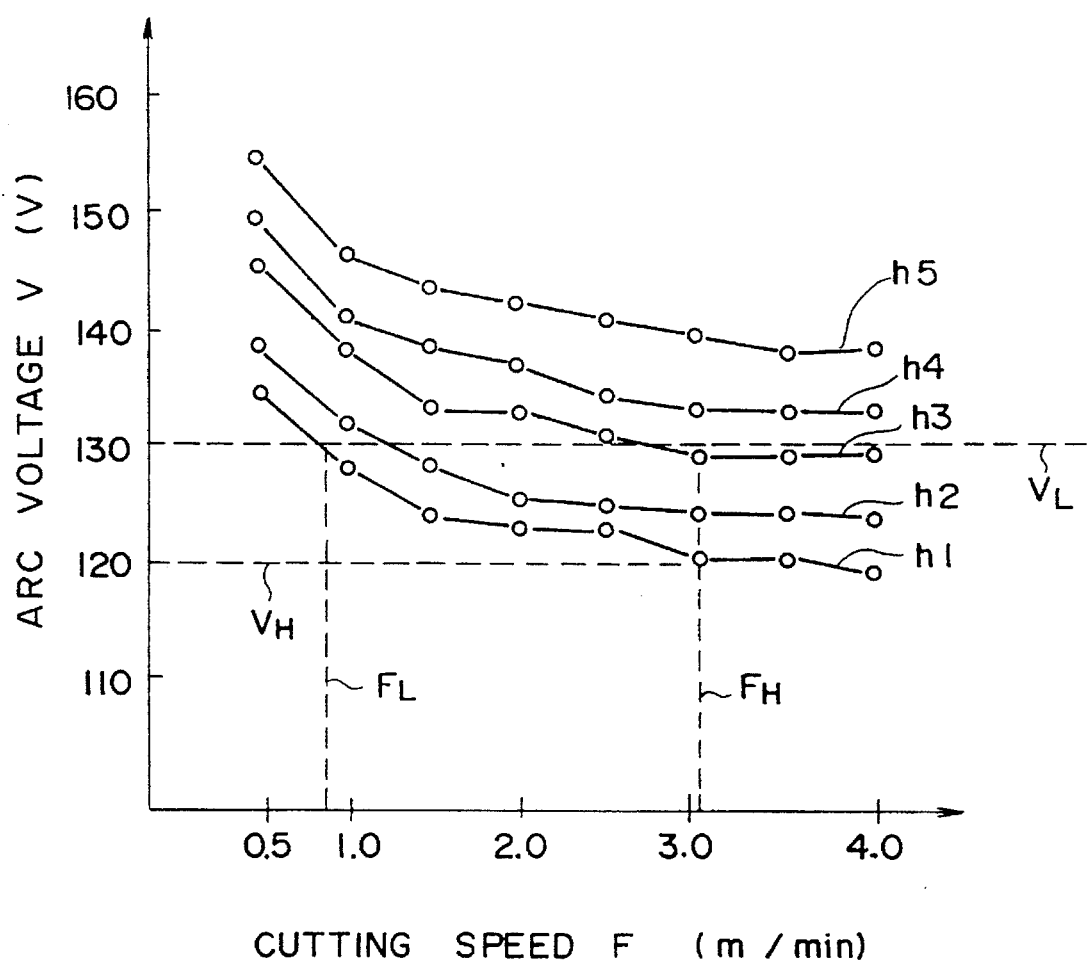
FIG. 5 is a graph showing the relationship between a processing speed and an arc voltage with stand-off as a parameter.

FIG. 4 is a graph comparing the characteristics of prior-art examples and the present embodiment. Characteristic values measured under the condition that the stand-off is maintained fixed and that only the cutting speed is varied are plotted in the figure in the order of the characteristics of the prior fixed stand-off system (region A), the characteristics of the prior-art speed-corrected stand-off system (region B), and the experimental characteristics of the present invention (region C).

In regions A, B and C, a torch correction signal $\Delta h$, an arc voltage V, a cutting speed correction term $\Delta F$, and the existence/nonexistence of or the state of input/output of the cutting speed F, from top to bottom, are plotted. Apart from the fixed stand-off system, the speed-corrected stand-off system and the present invention must be free of variations in the torch correction signal $\Delta h$ because the stand-off is held unchanged. This will hereinafter be described in detail.

In the fixed stand-off system (region A), the torch correction signals $\Delta h_1$, $\Delta h_2$ emerge remarkably at acceleration ($a_1 \sim a_2$) and deceleration ($a_3 \sim a_4$) and even after a shift to the zone of keeping the cutting speed unchanged. This is a natural consequence of the fact that the fixed stand-off system does not make correction for speed and delay time. To suppress the torch correction signals $\Delta h_1$, $\Delta h_2$, the applicants for the present invention have previously proposed the speed-corrected stand-off system. However, even in the speed-corrected stand-off system (region B), the torch correction signals $\Delta h_3$, $\Delta h_4$ emerge at acceleration ($b_1 \sim b_2$) and deceleration ($b_3 \sim b_4$) and even after a shift to the zone of keeping the cutting speed unchanged, even though the signals are less intensive than the signals $\Delta h_1$, $\Delta h_2$. It is an object of the present invention to suppress the signals $\Delta h_3$, $\Delta h_4$. According to the present invention shown in region C, because of an additional delay time correction $\Delta t$, emergence of the torch correction signal $\Delta h$ is suppressed greatly at acceleration ($c_1 \sim c_2$) and deceleration ($c_3 \sim c_4$) and even after a shift to the zone of keeping the cutting speed unchanged. Thus, the torch correction signal is substantially in a flat state. Without question, the signal will be in a flatter state by selecting a more appropriate delay time correction $\Delta t$. Noise caused by vibrations of the robot 5 may be responsible for vibrations of the torch correction signal $\Delta h$ over the entire region. Hence, it may be possible to reduce the vibrations by controlling vibrations of the robot 5 and shielding an arithmetic circuit and the like from electromagnetic waves.

INDUSTRIAL APPLICABILITY

The present invention is effective in serving as a stand-off control apparatus for plasma processing machines which is capable of securely maintaining an optimum stand-off and providing excellent quality of processing even when it is applied to three-dimensional robots and the like.

What is claimed is:

1. Apparatus for controlling a plasma processing machine having a plasma torch and a device for moving said plasma torch toward/away from a work to be processed, said apparatus comprising:

means for providing a speed signal representative of an actual cutting speed of said plasma torch;

means for providing an arc voltage signal representative of an arc voltage between said plasma torch and said work;

a microcomputer for storing a signal representative of a reference cutting speed of said plasma torch, a signal representative of a target arc voltage at the reference cutting speed, and a plurality of delay times; said microcomputer having an input for receiving said speed signal representative of an actual cutting speed of said plasma torch; said microcomputer having an input for receiving said arc voltage signal representative of an arc voltage between said plasma torch and said work; said microcomputer being adapted to determine, in response to the thus received speed signal, variations in said actual cutting speed of said plasma torch; said microcomputer being adapted to determine, in response to the thus determined variations, whether the actual cutting speed is being accelerated, is being decelerated or is being kept unchanged; said microcomputer being adapted to select a delay time from said plurality of delay times in response to a determination as to whether the actual cutting speed is being accelerated, is being decelerated or is being kept unchanged; said microcomputer being adapted to provide, after the thus selected delay time, a speed-corrected target arc voltage signal by correcting said signal representative of said target arc voltage for the thus determined variations in said actual cutting speed; and means for applying said speed-corrected target arc voltage signal to said device to maintain an optimum stand-off between said work and said plasma torch by moving said plasma torch toward/away from said work so that after said selected delay time the actual arc voltage agrees with said speed-corrected target arc voltage signal.

2. Apparatus in accordance with claim 1 wherein a first one of said plurality of delay times corresponds to a determination that the actual cutting speed is being accelerated, and a second one of said plurality of delay times corresponds to a determination that the actual cutting speed is being decelerated.

3. Apparatus in accordance with claim 1 wherein said device comprises a robot, and wherein said microcomputer comprises a robot controller and a stand-off controller.

4. Apparatus in accordance with claim 1, wherein said microcomputer is adapted to determine said variations in said actual cutting speed by storing a thus received speed signal and comparing the thus stored speed signal with a subsequently received speed signal; and wherein said microcomputer determines, in response to the thus determined variations: that, when the subsequently received speed signal is greater than the stored speed signal, the actual cutting speed is being accelerated; that, when the subsequently received speed signal is less than the stored speed signal, the actual cutting speed is being decelerated; and that, when the subsequently received speed signal equals the stored speed signal, the actual cutting speed is being kept unchanged.

5. Apparatus comprising:

a plasma processing machine having a plasma torch, a devices for moving said plasma torch toward/away from a work to be processed and for providing a relative movement between said plasma torch and said work along a cutting line at a cutting speed, and a power source for providing an arc voltage between said plasma torch and said work;

a device controller for controlling said device to move said plasma torch toward/away from said work;

a stand-off controller for storing a signal representative of a reference cutting speed of said plasma torch, a signal representative of a target arc voltage at the reference cutting speed, and a plurality of delay times;

means for inputting to said stand-off controller a speed signal representative of the actual cutting speed of said plasma torch;

means for inputting to said stand-off controller an arc voltage signal representative of the actual arc voltage of said plasma torch;

wherein said stand-off controller determines a variation in the thus inputted speed signal; determines whether the actual cutting speed is being accelerated, is being decelerated or is being kept unchanged; selects a delay time from said plurality of delay times in response to a determination as to whether the actual cutting speed is being accelerated, is being decelerated or is being kept unchanged; and after the thus selected delay time provides a corrected signal representative of a speed-corrected target arc voltage; and means for applying said corrected signal to said device controller to maintain an optimum stand-off between said work and said plasma torch by moving said plasma torch toward/away from said work so that after said selected delay time said actual arc voltage agrees with said speed-corrected target arc voltage, said speed-corrected target arc voltage being a correction of said target arc voltage for the thus determined variation in said actual cutting speed.

6. Apparatus in accordance with claim 1, wherein a first one of said plurality of delay times corresponds to a determination that the actual cutting speed is being accelerated, and a second one of said plurality of delay times corresponds to a determination that the actual cutting speed is being decelerated.

7. Apparatus in accordance with claim 6, wherein said stand-off controller is adapted to determine said variation in said thus inputted actual cutting speed by storing a thus inputted received speed and comparing the thus stored speed with a subsequently inputted actual cutting speed; and wherein said stand-off controller determines, in response to the thus determined variation: that, when the subsequently inputted actual cutting speed is greater than the stored speed, the actual cutting speed is being accelerated; that, when the subsequently inputted actual cutting speed is less than the stored speed, the actual cutting speed is being decelerated; and that, when the subsequently inputted actual cutting speed equals the stored speed, the actual cutting speed is being kept unchanged.

8. A method comprising the steps of:

positioning a plasma torch at a stand-off distance from a work to be cut by the plasma torch;

storing a signal representative of a reference cutting speed of said plasma torch, a signal representative of a target arc voltage at the reference cutting speed, and a plurality of delay times;

establishing an actual arc voltage between said plasma torch and said work to form a plasma arc;

providing a relative movement between said plasma torch and said work along a cutting line at a cutting speed so that said plasma arc cuts said work along said cutting line;

ascertaining an actual cutting speed of said plasma torch;

ascertaining an actual arc voltage of said plasma torch;

determining a variation in said actual cutting speed;

determining, from the thus determined variation in said actual cutting speed, whether said actual cutting speed is being accelerated, is being decelerated or is being kept unchanged;

selecting a delay time from said plurality of delay times in response to a determination as to whether said actual cutting speed is being accelerated, is being decelerated or is being kept unchanged; and after the thus selected delay time moving said plasma torch toward/away from said work to vary said stand-off distance in response to the thus determined variation in said actual cutting speed so as to maintain an optimum stand-off distance between said work and said plasma torch.

9. A method in accordance with claim 8, wherein said step of selecting a delay time comprises selecting a first one of said plurality of delay times when the actual cutting speed is being accelerated, and selecting a second one of said plurality of delay times when the actual cutting speed is being decelerated.

10. A method in accordance with claim 8, wherein said step of moving said plasma torch toward/away from said work to vary said stand-off distance comprises:

modifying said signal representative of said target arc voltage responsive to the thus determined variation in said actual cutting speed to establish a signal representative of a speed-corrected target arc voltage;

and, after said selected delay time, moving said plasma torch toward/away from said work to vary said stand-off distance in response to said signal representative of said speed-corrected target arc voltage so that said actual arc voltage agrees with said speed-corrected target arc voltage.

11. A method in accordance with claim 10, wherein said step of selecting a delay time comprises selecting a first one of said plurality of delay times when the actual cutting speed is being accelerated, and selecting a second one of said plurality of delay times when the actual cutting speed is being decelerated.

12. A method in accordance with claim 11, wherein said step of determining a variation in said actual cutting speed comprises storing a first signal representative of a thus ascertained actual arc voltage, and comparing the thus stored first signal with a second signal representative of a subsequently ascertained actual arc voltage; and wherein said step of determining, from the thus determined variation in said actual cutting speed, comprises determining that, when the second speed signal is greater than the first signal, the actual cutting speed is being accelerated; that, when the second signal is less than the first signal, the actual cutting speed is being decelerated; and that, when the second signal equals the first signal, the actual cutting speed is being kept unchanged.

13. A method in accordance with claim 8, wherein said step of determining a variation in said actual cutting speed comprises storing a first signal representative of a thus ascertained actual arc voltage, and comparing the thus stored first signal with a second signal representative of a subsequently ascertained actual arc voltage; and wherein said step of determining, from the thus determined variation in said actual cutting speed, comprises determining that, when the second speed signal is greater than the first signal, the actual cutting speed is being accelerated; that, when the second signal is less than the first signal, the actual cutting speed is being decelerated; and that, when the second signal equals the first signal, the actual cutting speed is being kept unchanged.

\* \* \* \* \*

UNITED STATES PATENT AND TRADEMARK OFFICE
CERTIFICATE OF CORRECTION

PATENT NO. : 5,521,350
DATED : May 28, 1996
INVENTOR(S) : Yoza NISHI et al

It is certified that error appears in the above-indentified patent and that said Letters Patent is hereby corrected as shown below:

Title page, Item [22], delete "Filed: Oct. 6, 1994" and insert

```
    --    PCT Filed: Apr. 6, 1993
    [86]  PCT No.:       PCT/JP93/00445
          § 371 Date:    Oct. 6, 1994
          § 102(e) Date: Oct. 6, 1994
    [87]  PCT Pub. No.:  WO 93/19883
          PCT Pub. Date: Oct. 14, 1993--.
```

Column 7, line 28, delete "devices" and insert --device--.

Column 7, line 66, delete "claim 1," and insert --claim 5,--.

Signed and Sealed this

Seventeenth Day of December, 1996

Attest:

BRUCE LEHMAN

*Attesting Officer*    *Commissioner of Patents and Trademarks*